(12) United States Patent
Tsunoda et al.

(10) Patent No.: US 7,172,130 B2
(45) Date of Patent: Feb. 6, 2007

(54) ELECTRONIC DEVICE, RUBBER PRODUCT, AND METHODS FOR MANUFACTURING THE SAME

(75) Inventors: Shigeharu Tsunoda, Fujisawa (JP); Hiroshi Hozoji, Hitachiota (JP); Madoka Minagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/960,074

(22) Filed: Oct. 8, 2004

(65) Prior Publication Data
US 2005/0101060 A1 May 12, 2005

(30) Foreign Application Priority Data
Oct. 8, 2003 (JP) ............................. 2003-348979

(51) Int. Cl.
G06K 19/06 (2006.01)
H05B 3/30 (2006.01)
B29V 45/14 (2006.01)
G08B 13/14 (2006.01)

(52) U.S. Cl. ................. 235/492; 438/127; 264/272.12; 264/272.15; 340/572.8

(58) Field of Classification Search ................ 361/600, 361/679, 737, 752, 727, 725; 257/787–795, 257/679, 682, 687; 438/106, 121, 124, 125–127; 264/272.13, 17, 272.15, 272.12, 15; 235/492, 235/487, 472.02, 435, 451; 340/572.8, 693.9
See application file for complete search history.

(56) References Cited

U.S. PATENT DOCUMENTS

| | | | | |
|---|---|---|---|---|
| 4,139,040 A | * | 2/1979 | Samoto et al. | 152/541 |
| 4,725,924 A | * | 2/1988 | Juan | 361/751 |
| 4,792,843 A | * | 12/1988 | Haghiri-Tehrani et al. | 257/679 |
| 5,048,179 A | * | 9/1991 | Shindo et al. | 29/840 |
| 5,218,861 A | * | 6/1993 | Brown et al. | 73/146.5 |
| 5,346,576 A | * | 9/1994 | Kobayashi et al. | 156/293 |
| 5,495,250 A | * | 2/1996 | Ghaem et al. | 342/51 |
| 5,500,065 A | * | 3/1996 | Koch et al. | 156/123 |
| 5,527,989 A | * | 6/1996 | Leeb | 174/35 GC |
| 5,822,194 A | * | 10/1998 | Horiba et al. | 361/760 |
| 5,834,850 A | * | 11/1998 | Hotta et al. | 257/788 |
| 5,982,284 A | * | 11/1999 | Baldwin et al. | 340/572.8 |
| 5,986,341 A | * | 11/1999 | Usami et al. | 257/723 |
| 5,986,569 A | * | 11/1999 | Mish et al. | 340/10.42 |

(Continued)

FOREIGN PATENT DOCUMENTS

EP 1308883 5/2003

(Continued)

*Primary Examiner*—Daniel Walsh
(74) *Attorney, Agent, or Firm*—Antonelli, Terry, Stout and Kraus, LLP.

(57) ABSTRACT

The present invention aims to improve the durability of an RFID chip inlet. A module including an RFID chip amounted to an antenna is covered with polyimide film with an adhesive layer to make up an RFID inlet. The outer surface of the RFID inlet is then covered with the surface processed to increase surface lubricity of a base part. When the RFID inlet is for use in a rubber product, it is mounted to a rubber base of the rubber product, the exposed surface of the RFID inlet is covered with an unvulcanized rubber, and the unvulcanized rubber is then pressed and heated causing the RFID inlet to be embedded in the rubber base.

24 Claims, 4 Drawing Sheets

U.S. PATENT DOCUMENTS

| | | | | |
|---|---|---|---|---|
| 5,991,159 | A * | 11/1999 | Kraiczyk | 361/737 |
| 6,140,697 | A * | 10/2000 | Usami et al. | 257/679 |
| 6,144,301 | A * | 11/2000 | Frieden | 340/572.8 |
| 6,206,292 | B1 * | 3/2001 | Robertz et al. | 235/488 |
| 6,215,401 | B1 * | 4/2001 | Brady et al. | 340/572.7 |
| 6,239,483 | B1 * | 5/2001 | Usami et al. | 257/679 |
| 6,357,685 | B1 * | 3/2002 | Wibmer | 242/118.32 |
| 6,788,192 | B2 * | 9/2004 | Shimura | 340/447 |
| 6,885,921 | B1 * | 4/2005 | Farmer | 701/29 |
| 6,886,246 | B2 * | 5/2005 | Chung | 29/832 |
| 6,894,615 | B2 * | 5/2005 | Look | 340/572.1 |
| 7,017,799 | B2 * | 3/2006 | Schwandner | 235/375 |
| 7,045,186 | B2 * | 5/2006 | Grabau et al. | 428/40.1 |
| 7,060,216 | B2 * | 6/2006 | Schuurmans | 264/272.15 |
| 2001/0011575 | A1 * | 8/2001 | Nakata et al. | 156/272.2 |
| 2002/0067268 | A1 * | 6/2002 | Lee et al. | 340/572.7 |
| 2002/0093085 | A1 * | 7/2002 | Shibata et al. | 257/687 |
| 2002/0130401 | A1 * | 9/2002 | Chee et al. | 257/678 |
| 2003/0031819 | A1 * | 2/2003 | Adams et al. | 428/40.1 |
| 2003/0080917 | A1 * | 5/2003 | Adams et al. | 343/841 |
| 2003/0102978 | A1 | 6/2003 | Schwandner | |
| 2003/0168514 | A1 * | 9/2003 | Rancien et al. | 235/492 |
| 2004/0066296 | A1 * | 4/2004 | Atherton | 340/572.1 |
| 2004/0094251 | A1 * | 5/2004 | Strache et al. | 152/152.1 |
| 2004/0104274 | A1 * | 6/2004 | Kotik et al. | 235/492 |
| 2004/0144847 | A1 * | 7/2004 | Yamanaka et al. | 235/492 |
| 2004/0150962 | A1 * | 8/2004 | Heinemann et al. | 361/737 |
| 2004/0223305 | A1 * | 11/2004 | Amiot et al. | 361/737 |
| 2004/0245348 | A1 * | 12/2004 | Nagaoka et al. | 235/492 |
| 2004/0256466 | A1 * | 12/2004 | Droz | 235/492 |
| 2005/0025927 | A1 * | 2/2005 | Yoshikawa | 428/40.1 |
| 2005/0133131 | A1 * | 6/2005 | Starinshak | 152/152.1 |

FOREIGN PATENT DOCUMENTS

| | | |
|---|---|---|
| EP | 1522957 | 4/2005 |
| JP | 07-223413 | 8/1995 |
| JP | 11-345299 | 12/1999 |
| JP | 2002-272589 | 9/2002 |

* cited by examiner

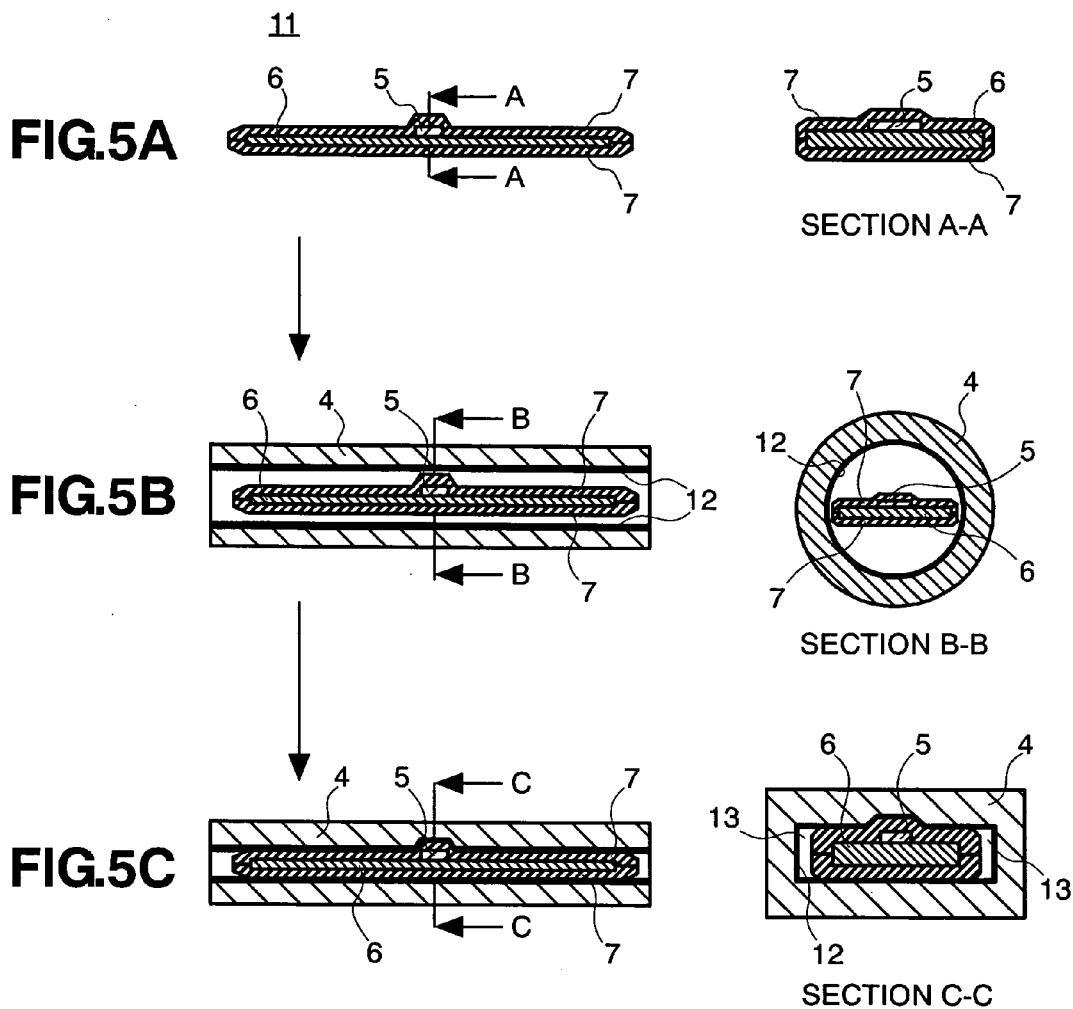
FIG.5A
FIG.5B
FIG.5C
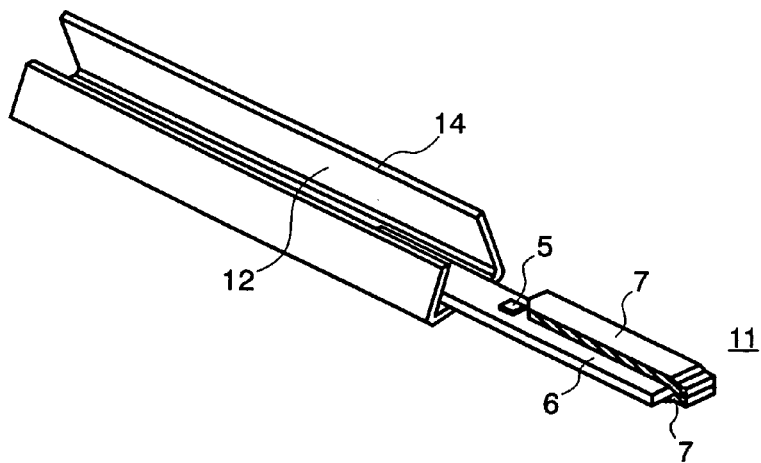
FIG.6

ELECTRONIC DEVICE, RUBBER PRODUCT, AND METHODS FOR MANUFACTURING THE SAME

CROSS-REFERENCE TO RELATED APPLICATIONS

The disclosure of Japanese Patent Application No. JP2003-348979, filed on Oct. 8, 2003, including the specification, drawings and abstract thereof, is incorporated herein by reference in its entirety.

BACKGROUND OF THE INVENTION

The present invention relates to an electronic device comprising a module which includes an antenna and an RFID chip electrically connected to the antenna.

Among the applications of an electronic device which comprises an RFID chip electrically connected to an antenna (hereinafter referred to as a module), there is a rubber product in which an electronic device comprising a module is embedded. Such conventional technology is disclosed in reference 1, Japanese Patent Unexamined Publication No. JP2002-272589A.

The above-mentioned Reference 1 describes a method in which a through-hole is formed in a corner at the edge of a mat, that is, a rubber product, a module is inserted in the through-hole, unvulcanized rubber is also inserted in the through-hole to enclose the module, and pressure and heat are applied from both sides of the unvulcanized rubber to vulcanize it, thereby making it a unified part of the vulcanized rubber that makes up the mat.

An IC card is a type of electronic device. Conventional technology relating to an IC card is disclosed in reference 2, Japanese Patent Unexamined Publication No. JP11-345299A.

The above-mentioned Reference 2 describes a method to make a module movable. In this method, a module coated beforehand with a surface lubricant, such as a silicone oil, is disposed between a pair of base parts, and a resin is then filled in and cured between the pair of base parts.

In the method which employs conventional technology to make a module movable, a module coated with a surface lubricant is enclosed by a resin (to be cured). Using this technique, even though the module does not come into direct contact with the resin, it is movable only within the limited space surrounded by the cured resin, so that the resultant effect of stress dispersion is very small.

In addition, the conventional technology, there are possibilities of causing bonding fracture between an RFID chip and an antenna, as well as antenna deformation. Also, there are cases in which, in mounting an electronic device to a rubber product, a module is embedded in vulcanized rubber by vulcanizing unvulcanized rubber, with priority being placed on the appearance or design or a need to satisfy the function requirements of the rubber product.

Usually, a process of vulcanizing unvulcanized rubber involves heating the unvulcanized rubber to a temperature of 100° C. to 300° C. and then cooling the heated rubber down to room temperature. The process causes the rubber to largely shrink, because the linear thermal expansion coefficient of rubber is very large. Therefore, the vulcanization process tends to cause a bonding fracture between an RFID chip and an antenna, as well as antenna deformation.

SUMMARY OF THE INVENTION

An object of the present invention is to increase the durability of an electronic device which includes a module comprising an RFID chip and an antenna, which are electrically interconnected.

Another object of the invention is to increase the durability of a rubber product which includes a module embedded in rubber, the module comprising an RFID chip and an antenna which are electrically interconnected.

A product structure is provided in which a module comprising an RFID chip and an antenna, which are electrically interconnected, is included together with adjacent spaces in which the module is movable. Because the module is substantially movable in the spaces, the stress on the bonding between an RFID chip and an antenna and also the stress on the antenna are reduced by dispersion. As a result, the durability of the module and the antenna increases, and, consequently, the durability of the product comprising the module also increases.

When the module is incorporated in a rubber product using a rubber vulcanization process in which the rubber is caused to shrink, the spaces in which the module is movable allows the stress generated during the process to be dispersed, so that the durability of the module and the antenna during the process is also enhanced.

The above-described structure of a product comprising a module which includes an RFID chip and an antenna, which are electrically interconnected, can increase the durability of the product.

BRIEF DESCRIPTION OF THE DRAWINGS

FIGS. 5A to 5C are diagrams which show a process in which an RFID inlet having a laminated structure is embedded in the base part that is processed to increase the surface lubricity.

FIG. 6 is a perspective view showing a process in which an RFID inlet is enclosed by the base part according to a second embodiment of the invention.

DETAILED DESCRIPTION OF THE PREFERRED EMBODIMENTS

Preferred embodiments of the present invention will be described hereinafter with reference to FIGS. 1 to 8.

As a first embodiment of an electronic device according to the present invention, a rubber product in which a module is embedded will be described.

Figure 1:
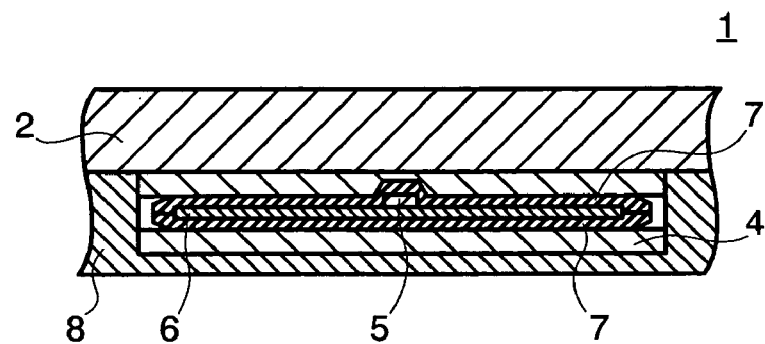
FIG. 1 is a cross sectional view of an electronic device comprising a rubber sheet in which an RFID inlet is embedded.

FIG. 1 shows a section of a portion of the product containing an RFID inlet 9 embedded in a rubber sheet 1, which constitutes a rubber product. The rubber sheet 1 comprises a rubber base 2, a base part 4 processed to increase the surface lubricity (a release agent like a release paper), a holding rubber member 8, and the RFID inlet 9.

The RFID inlet 9 comprises a thin, compact RFID chip 5 and a flat antenna 6 required for transmission and reception. The chip and antenna are metallurgically bonded, or more specifically, electrically connected, via a metal bump (not illustrated), thereby making up a module. The rubber sheet 1 further comprises a pair of polyimide film sheets 7, each having an adhesive layer, which sheets are pasted together sandwiching the module between them such that the main surfaces (the surface on which the RFID chip is mounted and the surface opposite thereto) of the module are covered with the adhesive layers of the two film sheets.

The pair of polyimide film sheets 7 sandwiching the module are enclosed by the base part 4, so that the main surfaces of the combined pair of polyimide film sheets 7, that is, the upper surface of the upper polyimide film sheet and the under surface of the lower polyimide film sheet, face the inner surface of the base part 4, which is processed to have an increased surface lubricity, and also so that there is a space between the end face on each side of the combined pair of polyimide film sheets 7 and the holding rubber member 8. In this arrangement, the inner surface of the base part 4, which is processed to have an increased surface lubricity, extends beyond the end face on each side of the combined pair of polyimide film sheets 1 and reaches the holding rubber member 8. The space provided at each end of the combined pair of polyimide film sheets 7 allows the module to laterally slide with ease to achieve appropriate stress dispersion. That is to say, the polyimide film functions as a release agent (ex. release paper).

The gaps generated where the RFID chip 5 is electrically connected to the flat antenna 6 via a metal bump (not illustrated) are filled with an underfill, for example, an epoxy resin, which is heat-cured to protect the connection (not illustrated).

The antenna 6 is preferably made of a flexible base material, such as a polyimide film, a polyethylene terephthalate film, a polyethylene naphthalate film, a polyethylene sulfide film, a polyethersulfone film, or a polyetherimide film. Also preferably, the antenna 6 is coated with a metallic film, preferably aluminum or copper, and it has a pattern formed by etching.

The top surface of the RFID inlet 9, that is held in position by the holding rubber member 8, is in contact with the rubber base 2. The other surfaces, that is, the side and bottom surfaces of the RFID inlet 9 are completely encased. In the present embodiment of the invention, the RFID inlet 9 is embedded under the rubber base 2 as a result of placing priority on appearance or design. It is quite possible to mount the RFID inlet 9 on the upper surface of the rubber base 2. In order to make the most of the maximum communication distance dependent on the antenna shape, it is desirable to position the RFID inlet 9 so that it is closest to an associated external terminal installed to receive and transmit ID information.

Figure 2:
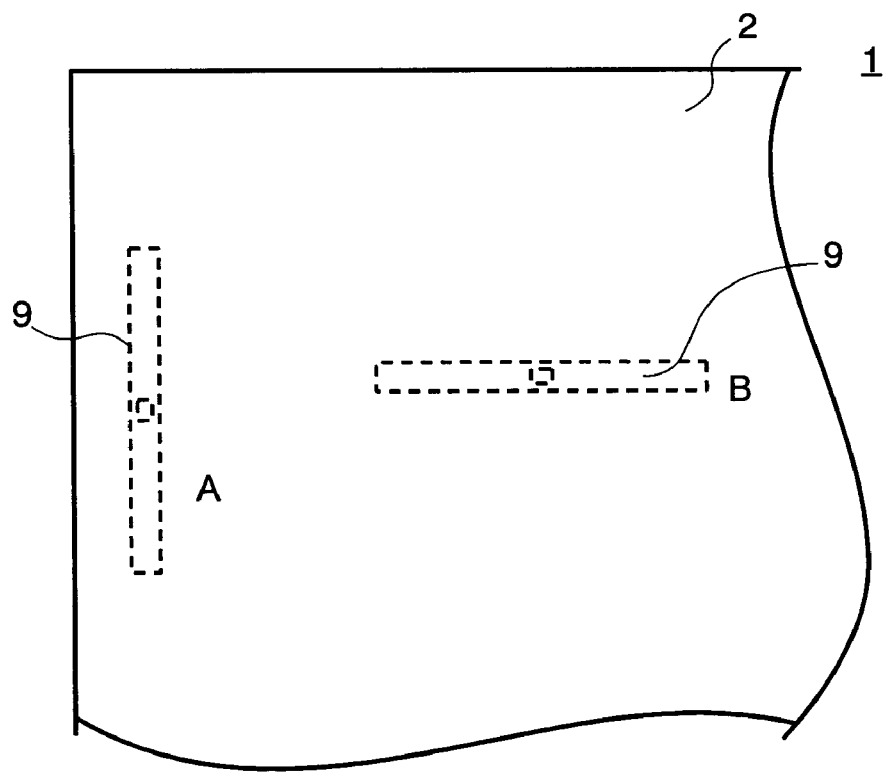
FIG. 2 is a top plan view of the rubber sheet.

FIG. 2 is a top plan view of the rubber sheet. The RFID inlet 9 may be disposed in either one of location A near the edge of the rubber sheet 1 and inner location B further inward on the rubber sheet 1. It is also preferable to embed a plurality of RFID inlets 9 in the same rubber base depending on the complementarity of a plurality of the RFID inlets 9 or the volume of information to be handled.

Figure 3:
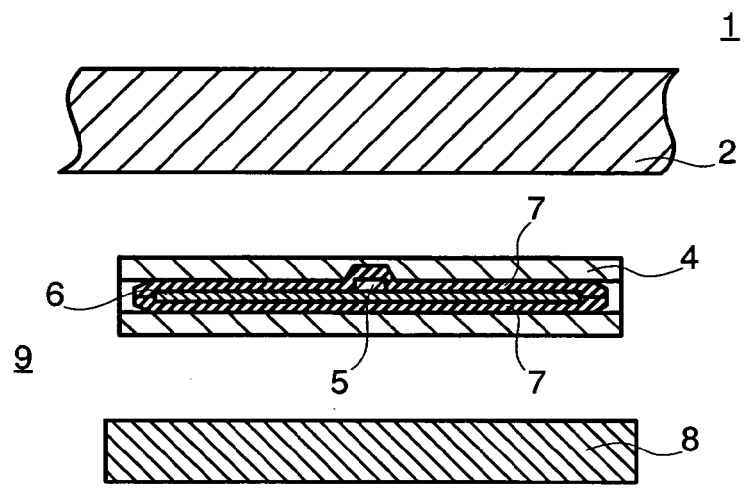
FIG. 3 is a sectional view showing how components are arranged when the RFID inlet is mounted to the rubber sheet.

FIG. 3 is a sectional view showing how the components are arranged when the RFID inlet is mounted to the rubber sheet.

Under the rubber base 2, the base part 4, which has been processed to have an increased surface lubricity and which is larger than an image of the RFID inlet produced by projection from above, is disposed such that the inner surface thereof, which is processed to have an increased surface lubricity, closely faces the RFID inlet 9.

Next, an unvulcanized rubber member 8 is disposed under the RFID inlet 9.

Then, using a press machine, the components arranged as described above are pressed from above the rubber base 2 and also from below the unvulcanized rubber member 8, while at the same time, the components being pressed are heated. This process of pressing and heating hardens the unvulcanized rubber member 8 and fixes it to the rubber base 2, causing the RFID inlet 9 to be fixed in position, as shown in FIG. 1.

Figure 4A:
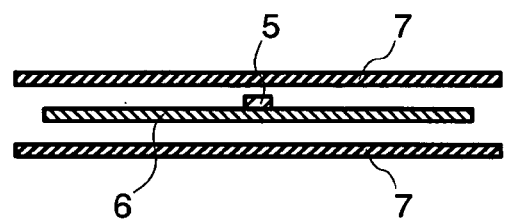
FIGS. 4A and 4B are diagrams which show a process of pasting a pair of polyimide film sheets, each having an adhesive layer, to the upper and under surfaces of the RFID inlet.
Figure 4B:
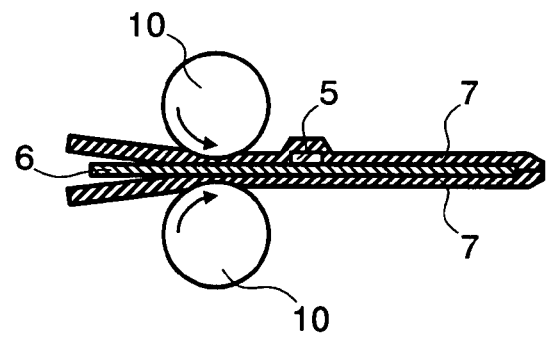

FIGS. 4A and 4B show a process of pasting the pair of polyimide film sheets 7, each having an adhesive layer, and which are to be included in the RFID inlet 9, to the module.

FIG. 4A shows an arrangement in which the pair of polyimide film sheets are disposed such that their adhesive layers face each other with the RFID inlet 9 being disposed in between them. The pair of polyimide film sheets 7, each having an adhesive layer, are pasted to the RFID inlet 9, using a film laminator.

FIG. 4B shows a lamination process in which the components arranged as shown in FIG. 4A are fed through a gap between a pair of upper and lower rollers 10 so as to be pasted together tightly into a voidless laminate structure. Needless to say, a different method may be used to paste them together.

FIGS. 5A to 5C show a process in which an RFID inlet 11, having a laminated structure, is embedded in the base part 4 that is processed to have an increased surface lubricity. FIG. 5A shows the RFID inlet 11 having a laminated structure. The RFID inlet 11 having a laminated structure comprises the RFID chip 5 and the antenna 6, which are electrically interconnected via a metallic bump (not illustrated). The gaps generated around the bump electrically connecting the RFID chip 5 and the antenna 6 are filled with a heat cured underfill, such as an epoxy resin (not illustrated). The RFID chip 5 is about 0.1 to 0.5 mm square by 0.02 to 0.5 mm thick.

The antenna 6 is made of a flexible organic film that is coated with a metallic film. The organic film material may be, for example, a polyimide resin or a polyethylene terephthalate resin. The metallic film material may be, for example, an alloy of copper and tin, or aluminum. The polyimide film sheets 7, each having an adhesive layer, have a base material thickness of 0.01 to 0.1 mm. The thickness of the adhesive layer is adjusted as required depending on the thickness of the RFID chip 5 to be used. The adhesive material is preferably a thermosetting resin, such as a silicone resin, an epoxy resin or a polyimide resin, which may be processed for increased flexibility. Shown on the right in FIG. 5A is an enlarged cross-sectional view, taken along line A—A, of the RFID inlet 11 having a laminated structure.

FIG. 5B shows the RFID inlet 11 inserted in a base part 4 having a cylindrical shape. The inner surface 12 of the base part 4 has been processed to have an increased surface lubricity. Shown on the right in FIG. 5B is an enlarged cross-sectional view taken along line B—B.

FIG. 5C shows the RFID inlet 11 and a base part 4 whose tubular shape has been flattened. This state is reached by pressing the components arranged as shown in FIG. 5B from above the RFID chip 5 and also from below the RFID chip 5.

Shown on the right in FIG. 5C is an enlarged cross-sectional view taken along line C—C. With the base part 4 flattened, there are gaps (spaces) 13 generated between the main surfaces and side surfaces of the antenna 6 and the inner surface of the base part 4, which is processed to have an increased surface lubricity. The gaps 13 give some freedom of movement to the RFID inlet 11, contributing toward generating a stress relief effect when the RFID inlet is embedded in the rubber sheet. In the present embodiment of the invention, although the base part 4 has a tubular shape with open ends, it goes without saying that the base part 4 may have a sack-like shape with one end closed.

Instead of the base part 4 having a tubular shape or a sack-like shape, a pair of sheets forming the base part 4 may also be used. In this case, the main surfaces (the antenna-mounted surface and the opposite surface) of the RFID inlet 11 are sandwiched between the surfaces of the pair of sheets of the base part 4 that are processed to have an increased surface lubricity. When using this method, each of the two sheets of the base part 4 may be larger than the shape, obtained by projection from above, of the RFID inlet 11, so that a space sandwiched between the two sheets of the base part 4 is generated beside the end face on each side of the RFID inlet.

The two sheets of the base part 4 may be pasted together in their marginal portions so that the RFID inlet is sealed between them so as to be entirely surrounded by their surfaces that have been processed to have an increased surface lubricity.

A wide range of materials which do not degrade when subjected to a rubber vulcanizing temperature of about 100° C. to 300° C. may be used as the material for the base part 4. The material may be, for example, paper, woven fabric or nonwoven fabric, such as bond paper or nonwoven paper. To increase the surface lubricity of the base part 4, it may be coated with a silicone resin or a tetrafluoride ethylene resin, or, it may be impregnated with wax or rosin. Or, it may be made of a material, such as a silicone resin or a tetrafluoride ethylene resin, which does not adhere to rubber. To be processed to have an increased surface lubricity is not limited to one side of the base part 4. The base part 4 may have both of its sides processed to have an increased surface lubricity.

A second embodiment of the present invention will now be explained with reference to FIGS. 6 and 7. FIG. 6 shows a process in which the RFID inlet 11 having a laminated structure is wrapped in the base part 14 that has been processed to have an increased surface lubricity.

In this figure, the portion comprising laminated polyimide film sheets 7, each with an adhesive layer, of the RFID inlet 11 is shown in a partial sectional view to clearly indicate the RFID inlet composition. The base part 14 is a sheet large enough to wrap the RFID inlet 11. It is folded in three parts with the surface 12 being processed to have an increased surface lubricity coming inside.

Figure 7:
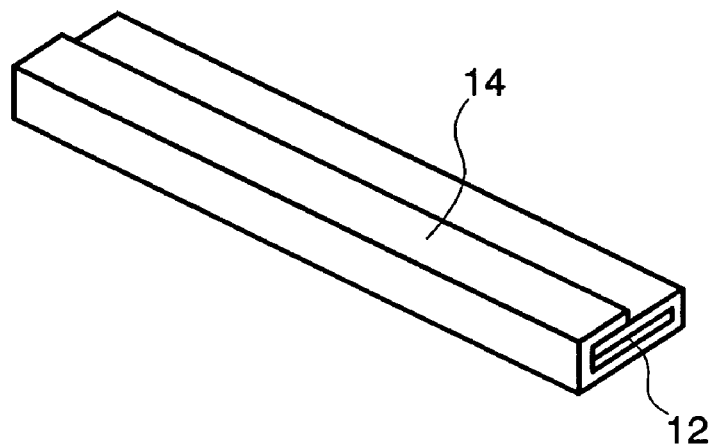
FIG. 7 is a perspective view showing the base part in a state after enclosing the RFID inlet.

FIG. 7 shows the base part 14, which is folded in three parts, hiding the RFID inlet 11 wrapped in it. This embodiment in which the RFID inlet 11 is wrapped in the base part 14 that is folded in three parts, as shown in this figure, is as effective as the first embodiment.

A stress relief effect can also be obtained by using an RFID inlet 11 that is wrapped in a base part 14 that is folded in two.

Figure 8:
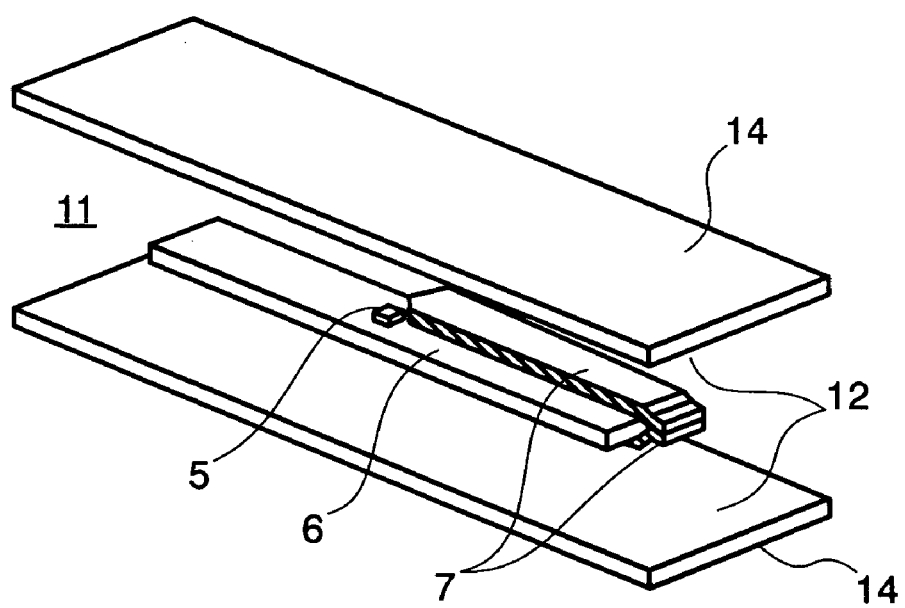
FIG. 8 is a perspective view showing a process in which an RFID inlet is enclosed by the base part according to a third embodiment of the invention.

FIG. 8 shows a third embodiment of the present invention. In this embodiment, the RFID inlet 11 is sandwiched between two sheets of the base part 14 disposed above and below it. This embodiment is also as effective as the first embodiment.

The present invention has been described with reference to particular embodiments for the manufacture of a rubber sheet. It is to be understood that the invention can be applied to other rubber products, such as vibration isolating sheets, tires, or rubber rollers for printers, to produce the same effects as for a rubber sheet.

The invention claimed is:

1. A method for manufacturing an electronic device, the electronic device comprising an RFID inlet which includes an RFID chip and an antenna provided opposite to each other, the RFID chip being electrically connected to the antenna, where the method comprises:

enclosing the RFID inlet in a base part having a release-agent surface so that surfaces of the RFID inlet oppose portions of the release-agent surface of the base part; and sandwiching the RFID inlet between the portions of the release-agent surface of the base part, and pressing the portions of the release-agent surface of the base part onto the surfaces of the RFID inlet so that portions of the base part deform to interlock a position of a predetermined portion of the RFID chip with respect to the base part;

wherein extension portions of the base part extend beyond ends of the RFID inlet and have the release-agent surface opposing each other, to form a space therebetween to accommodate stress relief movement of the RFID inlet.

2. The method of manufacturing an electronic device according to claim 1, wherein the release-agent surface of the base part is processed to increase lubricity thereof.

3. The method of manufacturing an electronic device according to claim 2, wherein the base part is formed of paper, woven fabric or non-woven fabric.

4. The method of manufacturing an electronic device according to claim 2, wherein the release-agent surface of the base part includes a coating of a silicone resin or a tetrafluoride ethylene resin to increase the lubricity thereof.

5. The method of manufacturing an electronic device according to claim 2, wherein the release-agent surface of the base part is impregnated with wax or rosin.

6. The method of manufacturing an electronic device according to claim 1, wherein the base part is formed of a silicone resin or a tetrafluoride ethylene resin.

7. The method of manufacturing an electronic device according to claim 1, wherein the base part is provided as a pair of base parts each having one of the respective portions of the release-agent surface, and each area of the pair of base parts is larger than an area of one of major surfaces of the RFID inlet opposite thereto, to thereby include the extension portions to form the spaces between the pair of base parts at both sides of the RFID inlet.

8. The method of manufacturing an electronic device according to claim 1, wherein the base part is folded so that one of the respective portions of the release-agent surface thereof is pressed to one major surface of the RFID inlet and another of the respective portions of the release-agent surface thereof is pressed to another major surface of the RFID inlet.

9. The method of manufacturing an electronic device according to claim 1, wherein
the RFID inlet has a laminated structure including a pair of film sheets in which one major surface of the RFID inlet including the RFID chip is covered with one sheet of the pair of film sheets, and another major surface of the RFIID inlet is covered with another sheet of the pair of film sheets, and
one of the respective portions of the release-agent surface of the base part is pressed onto one major surface of the RFID inlet and the RFID chip via the one sheet, and another of the respective portions of the release-agent surface of the base part is pressed onto the another major surface of the RFID inlet via the another sheet.

10. The method of manufacturing an electronic, device according to claim 9, wherein
each of the pair of film sheets has an adhesive layer formed on a surface thereof,
the adhesive layer of the one sheet is pasted to the one major surface of the RFID inlet having the RFID chip included therein, and
the adhesive layer of the another sheet is pasted to the another major surface of the RFID inlet.

11. The method of manufacturing an electronic device according to claim 9, wherein
the pair of film sheets are polyimide film sheets.

12. An electronic device comprising:
an RFID inlet having an antenna and an RFID chip electrically connected to the antenna each disposed on one of main surfaces of the RFID inlet opposite to each other; and
a base part having a release surface formed of a release agent, and enclosing the RFID inlet so that surfaces of the RFID inlet are opposite to respective portions of the release surface of the base part,
wherein the respective portions of the release surface of the base part have a press-fit on the surfaces of the RFID inlet, so that portions of the base part have deformed to interlock a position of a predetermined portion of the RFID chip with respect to the base part; and
wherein extension portions of the base part extend beyond ends of the RFID inlet and have the release surface opposing each other, to form a space therebetween to accommodate stress relief movement of the RFID inlet.

13. A rubber product comprising the electronic device according to claim 12 which is embedded in vulcanized rubber.

14. The electronic device according to claim 12, wherein the release surface of the base part has been treated processed to increase lubricity thereof.

15. The electronic device according to claim 14, wherein the base part is formed of paper, woven fabric or non-woven fabric.

16. The electronic device according to claim 14, wherein the surface of the base part is coated with a silicone resin or a tetrafluoride ethylene resin to increase the lubricity thereof.

17. The electronic device according to claim 14, wherein the release surface of the base part is impregnated with wax or rosin.

18. The electronic device according to claim 12, wherein the base part is formed of a silicone resin or a tetrafluoride ethylene resin.

19. The electronic device according to claim 12, wherein the base part comprises a pair of base parts each having the release surface, and
each of the pair of base parts is larger in area than an area of a major surface of the RFID inlet opposite thereto, to thereby include the extension portions to form the spaces between the pair of base parts at both sides of the RFID inlet.

20. The electronic device according to claim 12, wherein the base part is folded so that one of the respective portions of the releas surface thereof is pressed to one major surface of the RFID inlet and another of the respective portions of the release surface thereof is pressed to another major surface of the RFID inlet.

21. The electronic device according to claim 12, wherein the RFID inlet has a laminated structure including a pair of film sheets in which one major surface of the RFID inlet including the RFID chip is covered with one sheet of the pair of film sheets, and another major surface of the RFIID inlet is covered with another sheet of the pair of film sheets, and
one of the respective portions of the release surface of the base part is press-fit on one major surface of the RFID inlet and the RFID chip via the one sheet, and another of the respective portions of the release surface of the base part is press-fit on the another major surface of the RFID inlet via the another sheet.

22. The electronic device according to claim 21, wherein
each of the pair of film sheets has an adhesive layer formed on a surface thereof,
the adhesive layer of the one sheet is pasted to the one major surface of the RFID inlet having the RFID chip included therein, and
the adhesive layer of the another sheet is pasted to the another major surface of the RFID inlet.

23. The electronic device according to claim 21, wherein the pair of film sheets are polyimide film sheets.

24. A method for manufacturing an electronic device, the electronic device comprising an RFID inlet which includes an RFID chip and an antenna provided opposite to each other, the RFID chip being electrically connected to the antenna, where the method comprises:
enclosing the RFID inlet in a base part having a release-agent surface so that surfaces of the RFID inlet oppose portions of the release-agent surface of the base part; and
sandwiching the RFID inlet between the portions of the release-agent surface of the base part, and pressing the portions of the release-agent surface of the base part onto the surfaces of the RFID inlet so that portions of the base part deform to the RFID chip to interlock a position of a predetermined portion of the RFID inlet with respect to the base part;
wherein extension portions of the base part extend beyond ends of the RFID inlet and have the release-agent surface opposing each other, to form a space therebetween to accommodate stress relief movement of the RFID inlet.

* * * * *